US006895140B2

(12) United States Patent
Matsuo et al.

(10) Patent No.: US 6,895,140 B2
(45) Date of Patent: May 17, 2005

(54) SINGLE-MODE OPTICAL FIBER AND COMPOSITE OPTICAL LINE

(75) Inventors: Shoichiro Matsuo, Sakura (JP); Kuniharu Himeno, Sakura (JP); Koichi Harada, Sakura (JP)

(73) Assignee: Fujikura, Ltd., Tokyo (JP)

( * ) Notice: Subject to any disclaimer, the term of this patent is extended or adjusted under 35 U.S.C. 154(b) by 163 days.

(21) Appl. No.: 10/270,577

(22) Filed: Oct. 16, 2002

(65) Prior Publication Data

US 2003/0169988 A1 Sep. 11, 2003

(30) Foreign Application Priority Data

Oct. 29, 2001 (JP) ........................................ 2001-331283

(51) Int. Cl.[7] .............................................. G02B 5/172
(52) U.S. Cl. ........................................ 385/23; 430/321
(58) Field of Search .................... 385/23, 131; 430/321; 350/96.31

(56) References Cited

U.S. PATENT DOCUMENTS

| 4,372,647 A | 2/1983 | Okamoto et al. | |
|---|---|---|---|
| 5,555,340 A | 9/1996 | Omishi et al. | |
| 5,613,028 A | 3/1997 | Antos et al. | 385/123 |
| 5,878,182 A | 3/1999 | Peckham | |
| 5,887,105 A | 3/1999 | Bhagavatula et al. | 385/123 |
| 5,894,537 A | 4/1999 | Berkey et al. | 385/123 |
| 6,044,191 A | 3/2000 | Berkey et al. | 385/123 |
| 6,169,837 B1 | 1/2001 | Kato et al. | 385/127 |

FOREIGN PATENT DOCUMENTS

| CN | 1201913 | 12/1998 |
|---|---|---|
| EP | 0 859 247 A2 | 8/1998 |
| EP | 0 959 374 A1 | 11/1999 |
| EP | 1 052 528 A1 | 11/2000 |
| EP | 1 055 945 A2 | 11/2000 |
| EP | 1 072 909 A2 | 1/2001 |
| EP | 1 076 250 A1 | 2/2001 |
| JP | 8-220362 | 8/1996 |
| JP | 9-288220 | 11/1997 |
| JP | 2001-255433 | 9/2000 |
| JP | 2002-162529 | 6/2002 |
| WO | WO 01/63329 | 2/2001 |

OTHER PUBLICATIONS

Yamada, Naritoshi et al., "Dispersion shifted fibers with low nonlinear sensitivity," IEICE Technical Report, Optical Communication Systems, OCS–94–74, Nov. 18, 1994, pp. 81–86.

*Primary Examiner*—John R. Lee
*Assistant Examiner*—Zia R. Hashmi
(74) *Attorney, Agent, or Firm*—Blank Rome LLP

(57) ABSTRACT

A single-mode optical fiber has a core and a cladding, and is produced in such a way that, when the radii of layers having individual refractive indexes are varied, more than one optical properties of the core, for example, the effective core area $A_{eff}$ and the dispersion slope exhibit respective limiting values within a specific range of a reference radius. Such optical fibers provide basically the same optical properties but enable to vary the chromatic dispersion within a specific range so that the single-mode optical fiber is ideally suited for use in high-speed and large capacity communication systems.

8 Claims, 14 Drawing Sheets

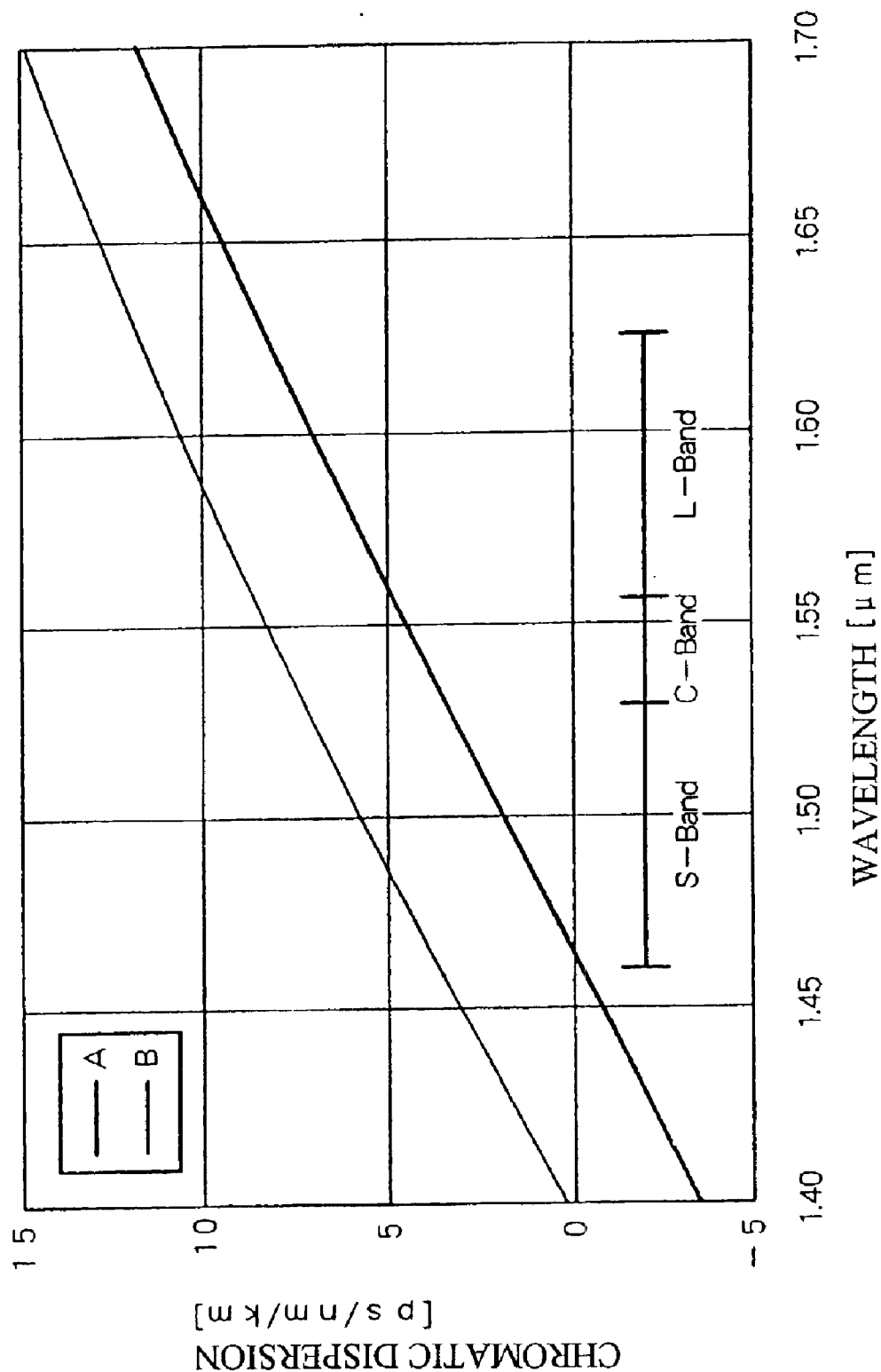

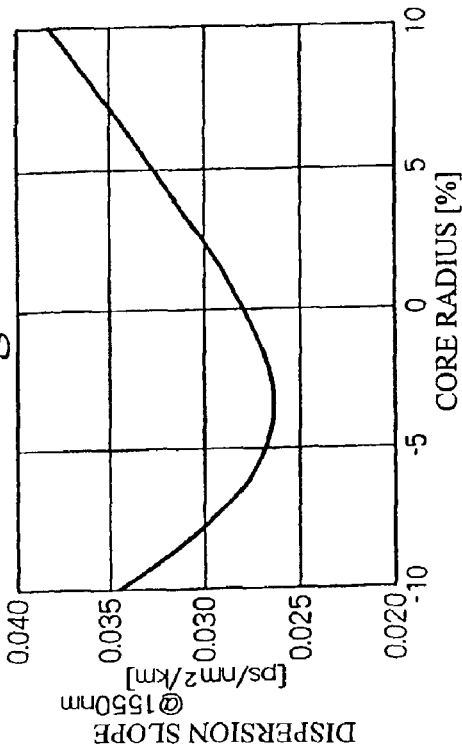
Fig. 5A
Fig. 5B
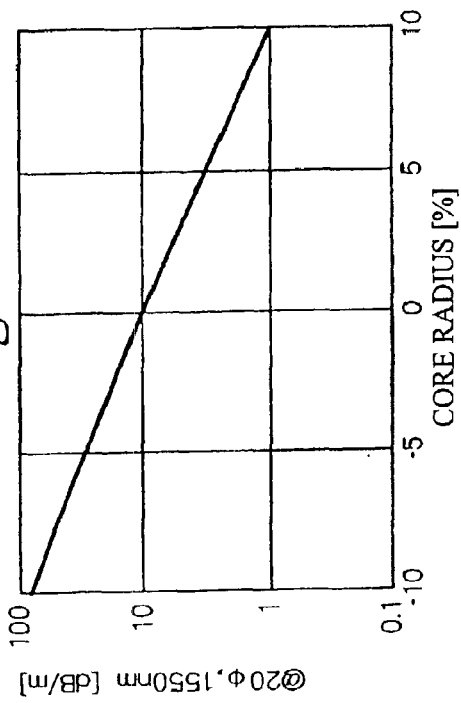
Fig. 5C
Fig. 5D
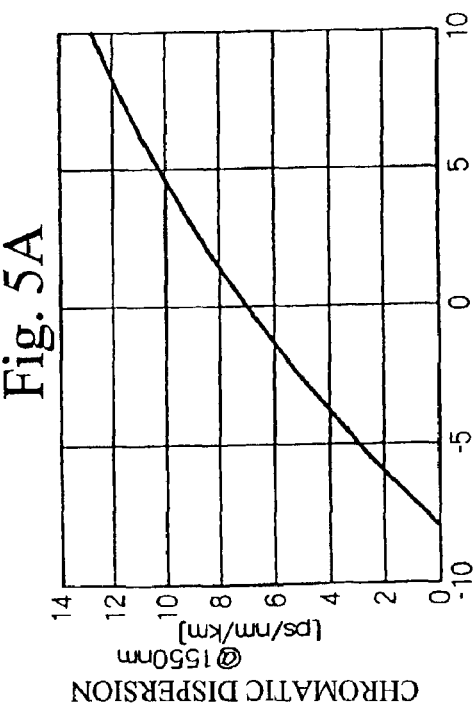
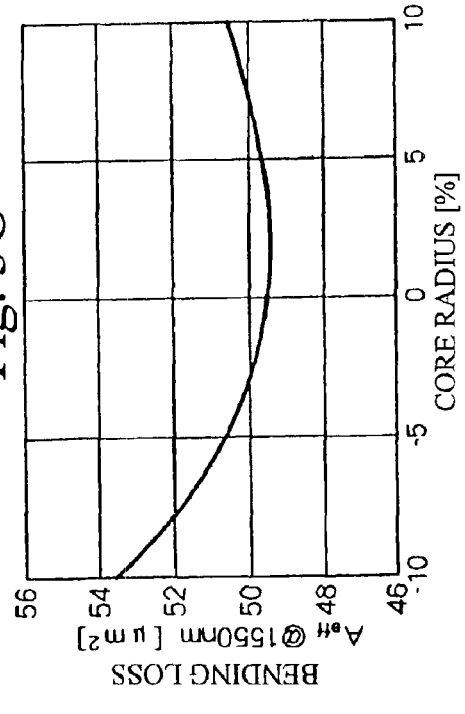

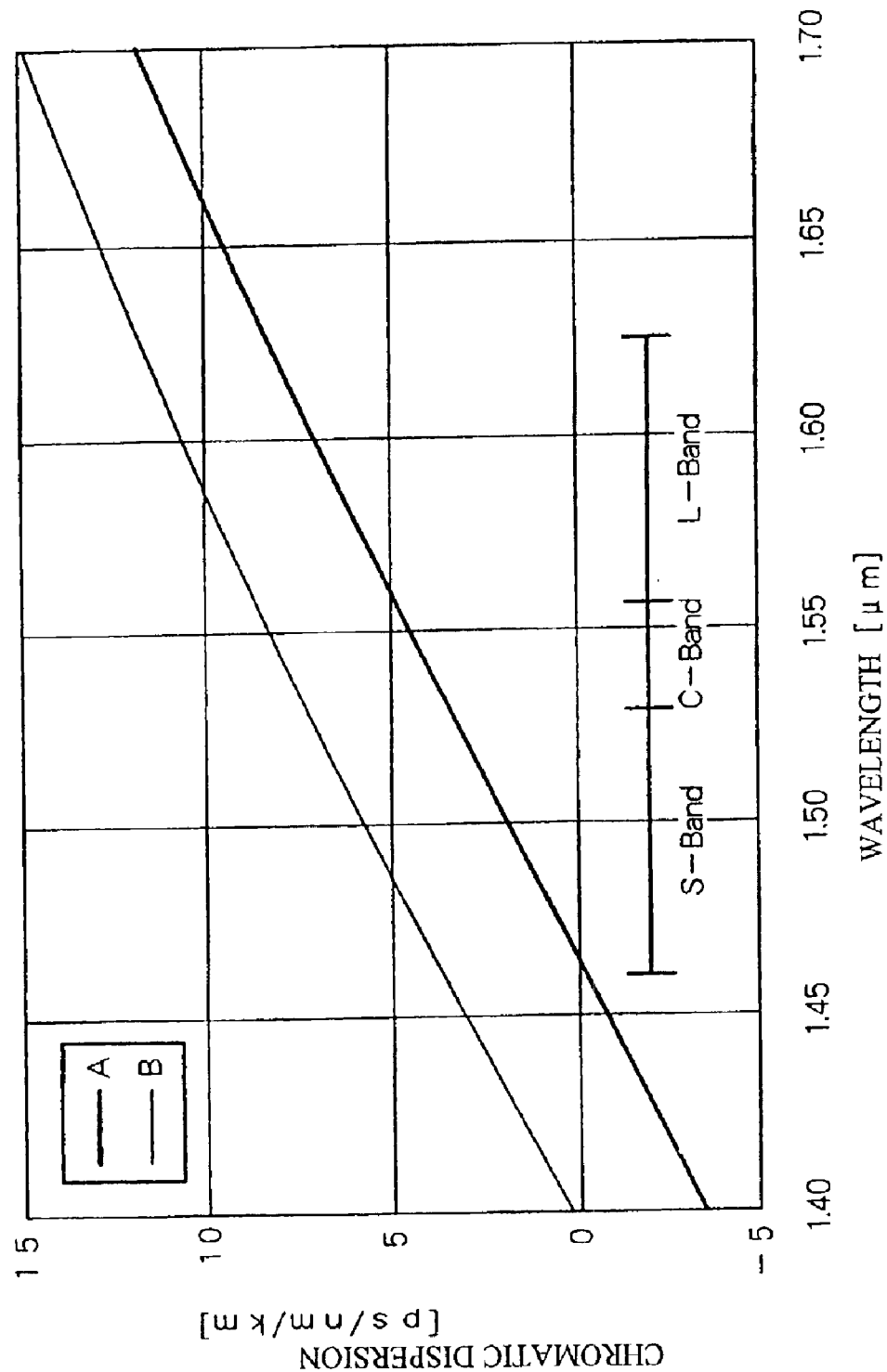

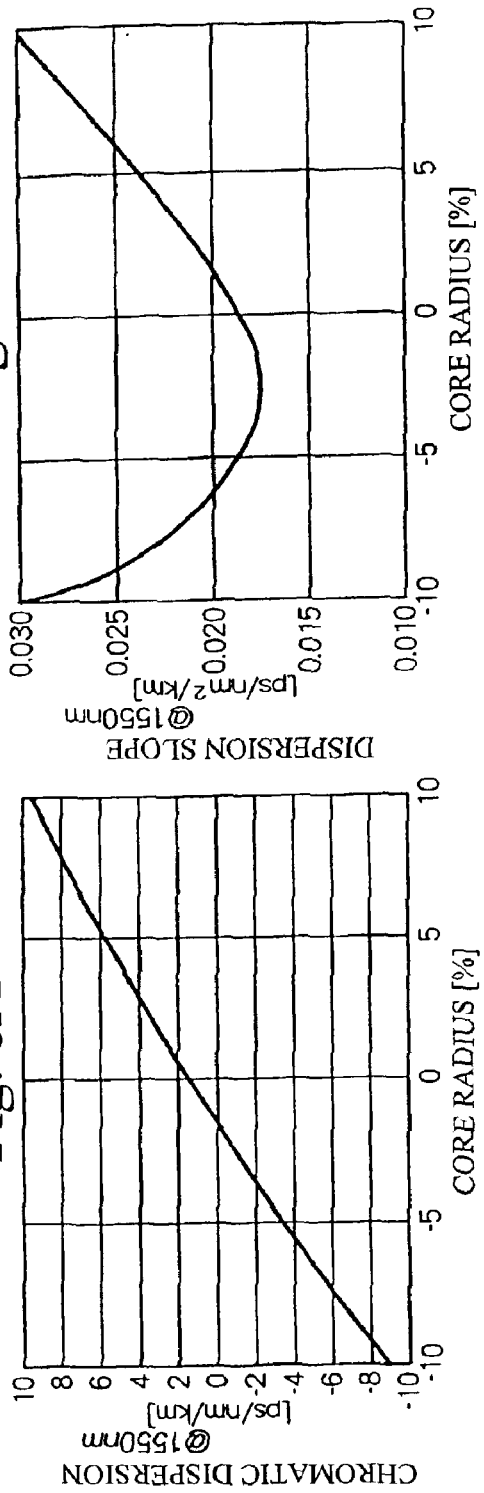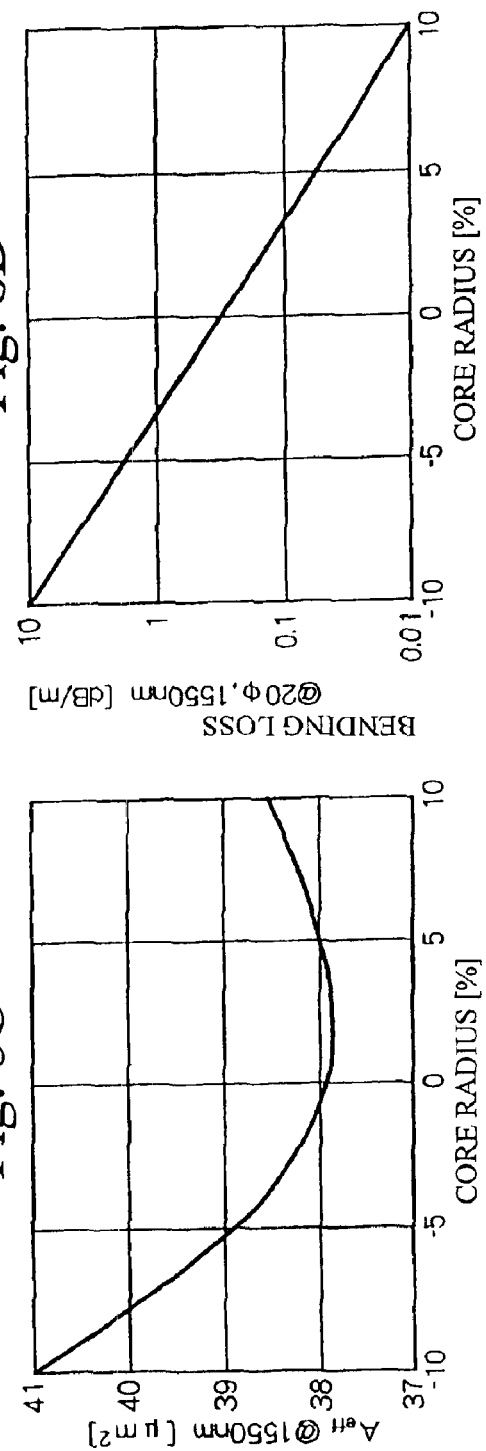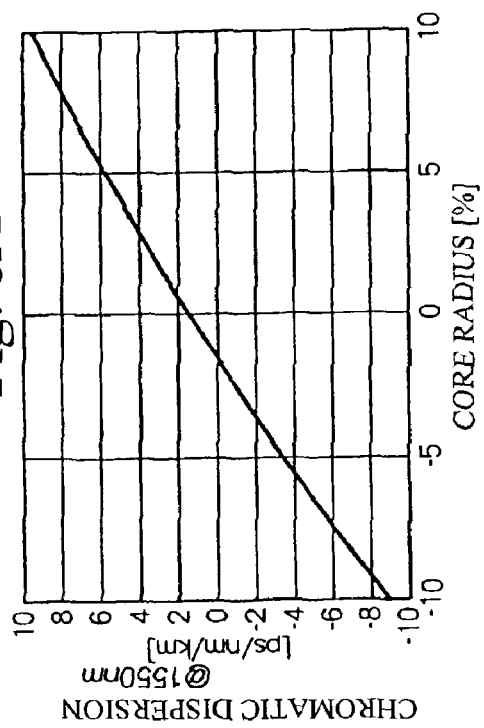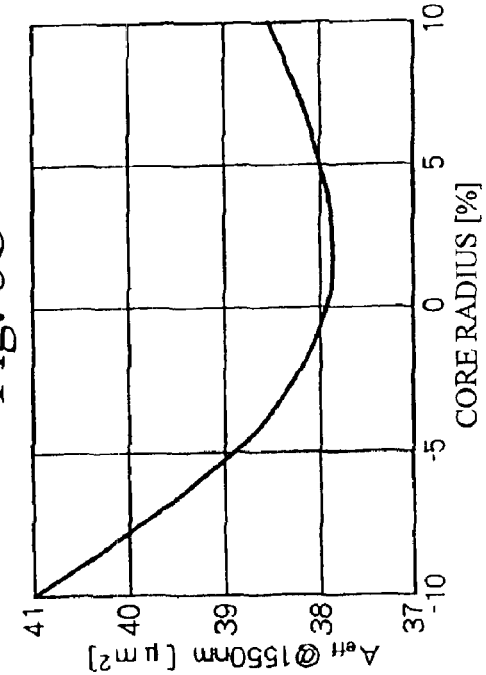

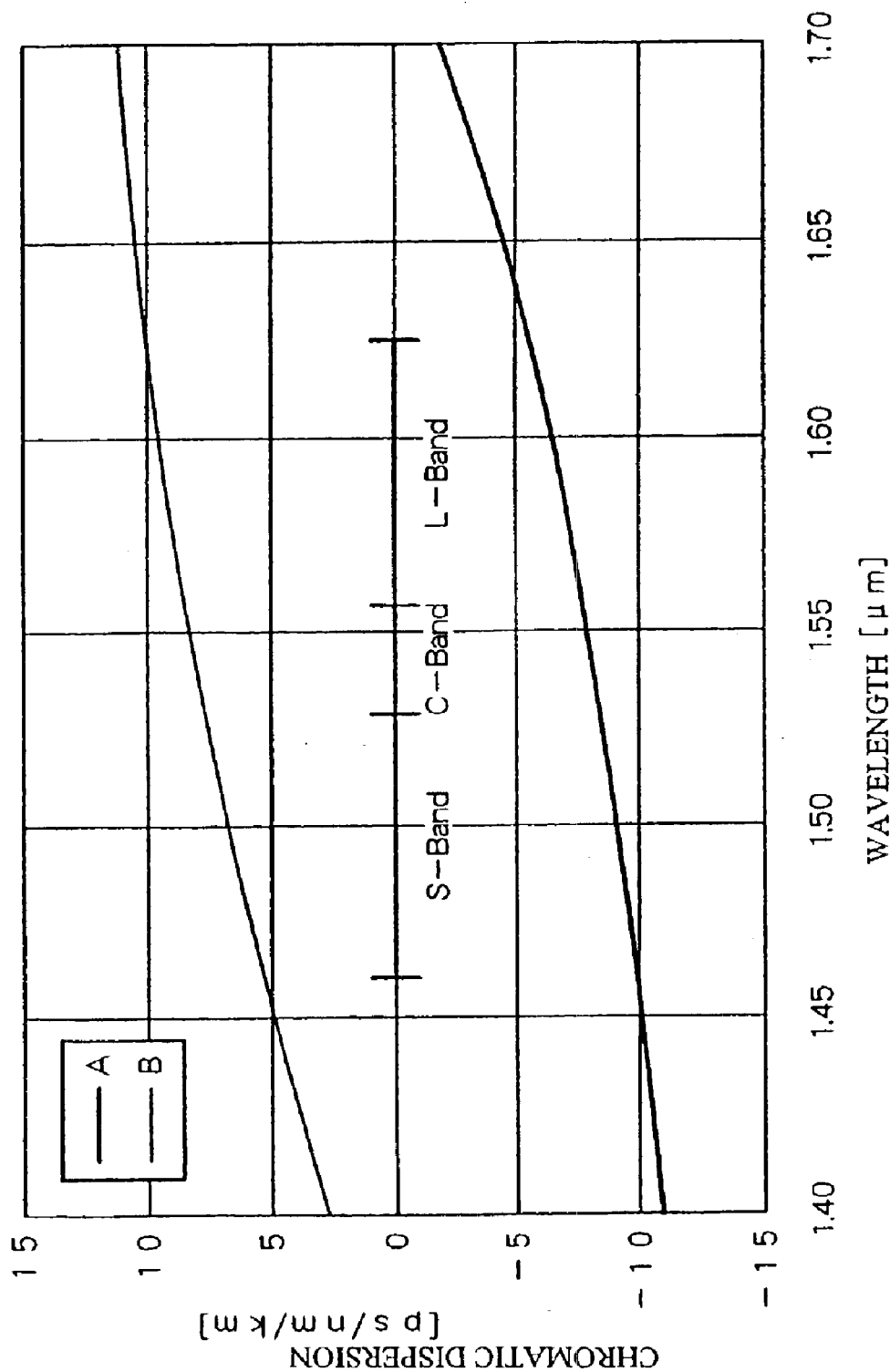

SINGLE-MODE OPTICAL FIBER AND COMPOSITE OPTICAL LINE

BACKGROUND OF THE INVENTION

1. Field of the Invention

The present invention relates to optical fibers used in optical communication systems, and relates in particular to an optical fiber suitable for use in high-speed and large capacity communication systems based on the wavelength division multiplexing (hereinafter abbreviated to "WDM") method.

2. Description of the Related Art

Capacity of optical transmission system has been increasing significantly using the WDM method. In the WDM method, reduction of non-linear effects and control of chromatic dispersion are required in transmission optical fibers.

In general, the non-linear effects in an optical fiber is represented by $n_2/A_{eff}$, where $n_2$ is a non-linear refractive index of the optical fiber and $A_{eff}$ is an effective core area of the optical fiber. Therefore, the non-linear effects is inversely proportional to $A_{eff}$. Accordingly, various optical fibers are developed such as optical fibers having enlarged effective core area $A_{eff}$, optical fibers having reduced dispersion slope, and optical fibers compensating dispersion slopes.

In order to increase the transmission capacity based on the WDM method, two methods are mainly used. The first method is a method of increasing the number of waves for multiplexing, and the second method is a method of improving the transmission speed.

As the method of increasing the number of waves for multiplexing, there is a trend of broadening the wavelength band for transmission. A 1550 nm-band is mainly used as a wavelength band for the WDM method. In the 1550 nm-band, a band known as the C-band (conventional band, 1530–1565 nm) has been widely used, but in recent years, there has been a trend of the use of the L-band (long wavelength band, 1565–1625 nm) and S-band (short wavelength band, 1460–1530 nm) for communication.

Therefore, various optical fibers are proposed such as optical fibers for use in C-band and L-band, and optical fibers having larger chromatic dispersion for use in S-, C- and L-bands.

However, refractive index profile in all the conventional optical fibers are designed to achieve desired optical characteristics in the vicinity of a certain chromatic dispersion. FIG. 14 is a graph showing chromatic dispersion characteristics of typical optical fibers for the WDM. Optical fibers A and B having individual chromatic dispersion characteristics are realized by using individual refractive index profile to the optical fibers.

A method for manufacturing dispersion shifted optical fibers in order to suppress the non-linear effects in low level is disclosed in a Japanese Unexamined Patent Application, First Publication No. Hei 8-220362. The invention disclosed in the Japanese Unexamined Patent Application, First Publication No. Hei 8-220362 discloses a method for designing an optical fiber having an enlarged mode field diameter (hereinafter abbreviated to "MFD") in the 1.55 μm-band. As shown in a reference document (The Institute of Electronics, Information and Communication Engineers, IEICE Technical Report, Optical Communication Systems, OCS-94-74, Nov. 18, 1994) relating to the above patent application, in the design region of MFD enlarged optical fibers shown in the application, the chromatic dispersion and MFD vary monotonically as the core radius changes.

As a result, if the core radius is adjusted using an optical fiber core rod having a refractive index profile designed according to the method of the above patent application so as to have a chromatic dispersion different from a predetermined chromatic dispersion, it is unavoidable to occur a large change in the MFD.

When an optical fiber prepared according to the above method causes the decrease of the MFD of the optical fiber, it is not only disadvantageous in view of splice loss, but also, when the optical power density transmitted into the optical fiber is high, as in optical amplifiers, problems are occurred such as increase of non-linear effects and degradation of the transmission characteristics.

On the other hand, it is also required to reduce the dispersion slope in optical fibers for the WDM. Reducing the dispersion slope enables the small chromatic dispersion variation over a broad wavelength bandwidth. This is extremely important in high-speed transmission systems, in which the chromatic dispersion severely limits the transmission distance. In conventional optical fibers, chromatic dispersion slope typically has higher than 0.05 ps/nm²/km, but in high-speed transmission systems, it is required to provide optical fibers having a dispersion slope of 0.05 ps/nm²/km or less.

SUMMARY OF THE INVENTION

The present invention is provided in view of the problems described above, and an object is the provision of a single-mode optical fiber which chromatic dispersion can be adjusted over a wide range using a single refractive index profile by the adjustment of the core radius, in other words, the object is the provision of an optical fiber preferably for use in high-speed and large capacity communication systems based on a wavelength division multiplexing (WDM) method.

To achieve the above object, the present invention provides a single-mode optical fiber comprising a core and a cladding, wherein the core comprises two or more layers having individual refractive indexes and at least one optical property exhibits an extreme value within a specific range of the core radius when a core radius is changed.

According to the above structure, it can vary the chromatic dispersion within a desired range so that an optical fiber having a desired chromatic dispersion can be made according to a single refractive index profile in a single-mode optical fiber, while the optical properties are maintained.

In the single-mode optical fiber described above, the optical property may exhibit the extreme value within a range of ±10% of a reference radius of the core.

In the single-mode optical fiber described above, the optical property may exhibit the extreme value within a range of ±5% of a reference radius of the core.

In the single-mode optical fiber, at least one optical property may comprise chromatic dispersion dependency which exhibits the extreme value.

In the single-mode optical fiber described above, the optical property may exhibit the extreme value in a region extending from a positive chromatic dispersion to a negative chromatic dispersion.

In the single-mode optical fiber, the optical property may be a dispersion slope.

In the single-mode optical fiber wherein the optical property exhibits the extreme value in a region extending from a positive chromatic dispersion to a negative chromatic dispersion, the optical property may exhibit the extreme value in a region extending from a positive dispersion slope to a negative dispersion slope.

In the single-mode optical fiber, the optical property may be an effective core area or a mode field diameter.

In the single-mode optical fiber, a dispersion slope may have 0.05 ps/nm$^2$/km or less in an operating wavelength bandwidth.

In the single-mode optical fiber, a dispersion slope may have 0.03 ps/nm$^2$/km or less in an operating wavelength bandwidth.

In the single-mode optical fiber, at least one layer of the layers composing the core having individual refractive indexes may have a refractive index which is less than a refractive index of a cladding.

Furthermore, the present invention provides a composite optical line compensating the dispersion slope by combining the single-mode optical fiber in which the optical property exhibits the extreme value in a region extending from a positive chromatic dispersion to a negative chromatic dispersion and exhibits the extreme value in a region extending from a positive dispersion slope to a negative dispersion slope.

According to the structures described above, when the extreme value of the optical properties are exhibited by the effective core area or the MFD, since these parameters are not greatly affected even if the core radius is changed, the single-mode optical fiber can have reduced non-linear effects.

Furthermore, since the optical fibers are prepared so as to exhibit the extreme value extending from a positive region to a negative region of the chromatic dispersion and the dispersion slope, single-mode optical fibers exhibiting extreme values of the chromatic dispersion and the dispersion slope can have different signs from each other, while the single-mode fibers substantially have the same optical property.

Moreover, the single-mode optical fibers are combined to produce the composite optical line which can compensate the dispersion slope.

BRIEF DESCRIPTION OF THE DRAWINGS

FIG. 4 is a diagram showing the chromatic dispersion in the operative wavelength bandwidth in the first embodiment of the single-mode optical fiber according to the present invention.

FIG. 5A is a diagram showing calculated values of variation in the chromatic dispersion with respect to changes in the core radius in a second embodiment of the single-mode optical fiber according to the present invention.

FIG. 5B is a diagram showing calculated values of variation in the dispersion slope with respect to changes in the core radius in the second embodiment of the single-mode optical fiber according to the present invention.

FIG. 5C is a diagram showing calculated values of variation in the effective core area with respect to changes in the core radius in the second embodiment of the single-mode optical fiber according to the present invention.

FIG. 5D is a diagram showing calculated values of variation in the bending loss with respect to changes in the core radius in the second embodiment of the single-mode optical fiber according to the present invention.

FIG. 7 is a diagram showing the chromatic dispersion in the operative wavelength bandwidth in the second embodiment of the single-mode optical fiber according to the present invention.

FIG. 8A is a diagram showing calculated values of variation in the chromatic dispersion with respect to changes in the core radius in a third embodiment of the single-mode optical fiber according to the present invention.

FIG. 8B is a diagram showing calculated values of variation in the dispersion slope with respect to changes in the core radius in the third embodiment of the single-mode optical fiber according to the present invention.

FIG. 8C is a diagram showing calculated values of variation in the effective core area with respect to changes in the core radius in the third embodiment of the single-mode optical fiber according to the present invention.

FIG. 8D is a diagram showing calculated values of variation in the bending loss with respect to changes in the core radius in the third embodiment of the single-mode optical fiber according to the present invention.

FIG. 10 is a diagram showing the chromatic dispersion in the operative wavelength bandwidth in the third embodiment of the single-mode optical fiber according to the present invention.

DETAILED DESCRIPTION OF THE PREFERRED EMBODIMENTS

The present invention is explained below in detail.

The first embodiment of the single-mode optical fiber of the present invention is explained with reference to FIGS. 1 to 4.

Figure 1:
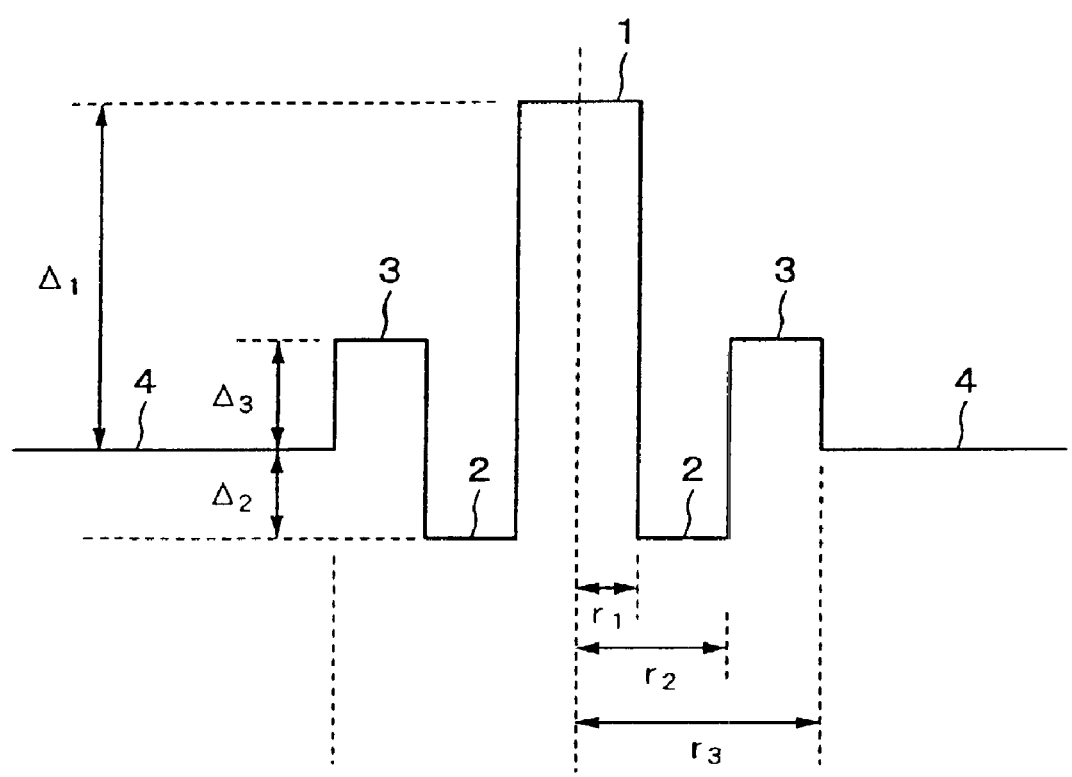
FIG. 1 is a diagram showing a refractive index profile of a single-mode optical fiber according to the present invention.

The single-mode optical fiber comprises a core and a cladding, and the core comprises two or more layers having individual refractive indexes. FIG. 1 shows an example of the refractive index profile of the single-mode optical fiber.

FIG. 1 shows central core 1, depressed core 2 provided on the outer periphery of central core 1, ring core 3 provided on the outer periphery of depressed core 2, and cladding 4 provided on the outer periphery of ring core 3.

Central core 1 has a refractive index greater than that of cladding 4, depressed core 2 has a refractive index lesser than that of cladding 4, and ring core 3 has a refractive index greater than that of cladding 4.

The single-mode optical fiber were designed based on the core radii and relative refractive index differences as shown in Table 1, and the calculated values of the optical properties of the single-mode optical fiber were shown in Table 2.

TABLE 1

| $r_2/r_1$ | $r_3/r_1$ | $\Delta_1$ | $\Delta_2$ | $\Delta_3$ |
|---|---|---|---|---|
| 2.0 | 2.7 | 0.53 | −0.10 | 0.20 |

TABLE 2

| Cut-off wavelength [nm] | $A_{eff}$ [$\mu m^2$] | MFD [$\mu m$] | Chromatic dispersion [ps/nm/km] | Dispersion slope [ps/nm$^2$/km] | Bending loss [dB/m] |
|---|---|---|---|---|---|
| 1180 | 50.23 | 8.09 | +7.6 | +0.046 | 0.4 |

Notes:
values are estimated at 1550 nm wavelength; bending loss at 20 φ

Figure 2A:
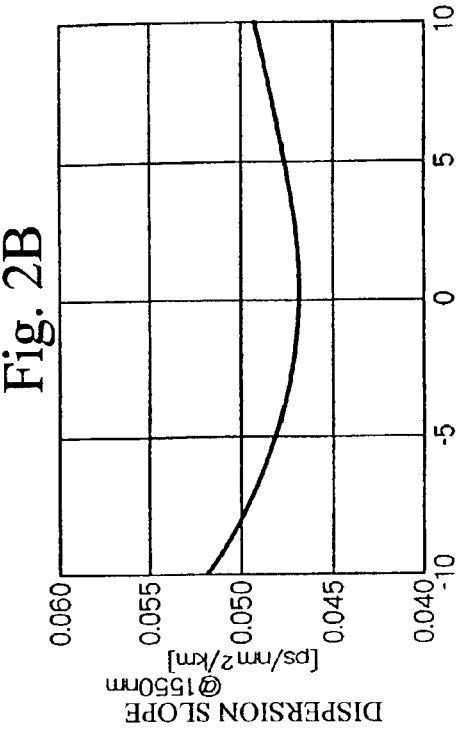
FIG. 2A is a diagram showing calculated values of variation in the chromatic dispersion with respect to changes in the core radius in a first embodiment of the single-mode optical fiber according to the present invention.
Figure 2B:
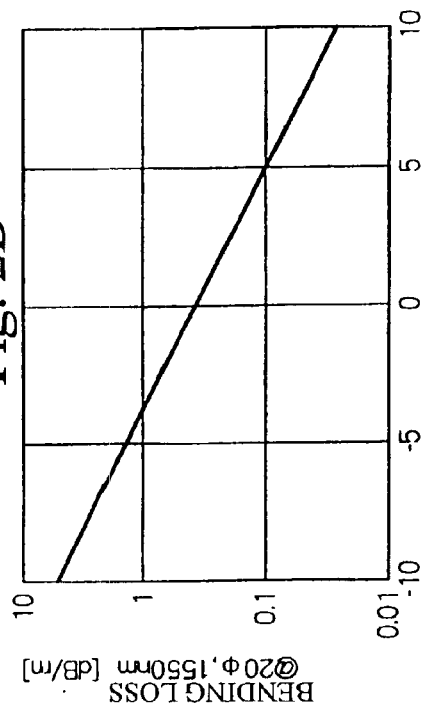
FIG. 2B is a diagram showing calculated values of variation in the dispersion slope with respect to changes in the core radius in the first embodiment of the single-mode optical fiber according to the present invention.
Figure 2C:
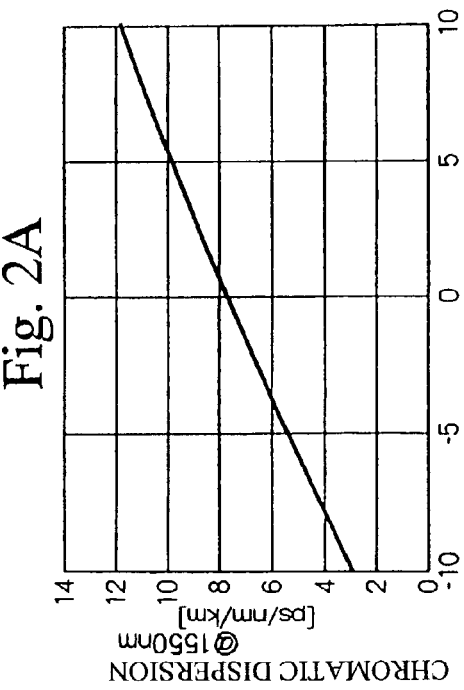
FIG. 2C is a diagram showing calculated values of variation in the effective core area with respect to changes in the core radius in the first embodiment of the single-mode optical fiber according to the present invention.
Figure 2D:
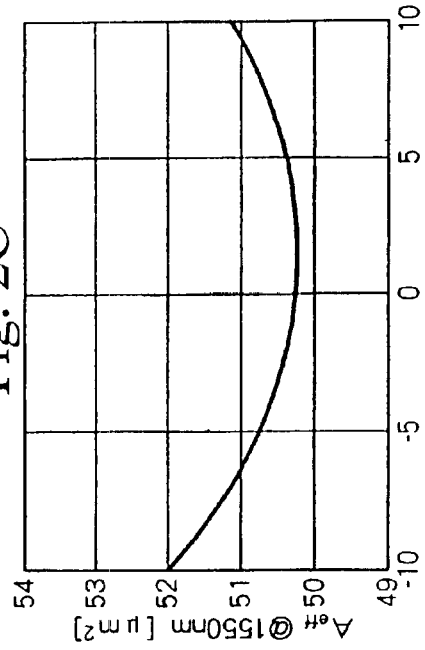
FIG. 2D is a diagram showing calculated values of variation in the bending loss with respect to changes in the core radius in the first embodiment of the single-mode optical fiber according to the present invention.

FIGS. 2A to 2D show the variations in the optical properties upon changes in a core radius in an optical fiber having the refractive index profile shown in FIG. 1 and Table 1, and FIG. 2A shows the variation in the chromatic dispersion at 1550 nm wavelength; FIG. 2B shows the variation in the dispersion slope at 1550 nm wavelength; FIG. 2C shows the variation in the effective core area $A_{eff}$ at 1550 nm; and FIG. 2D shows the variation in the bending loss at a bending diameter of 20 φ. Here, the core radius shown in the x-axis is a relative value reference to design center of radius, and in this example, the reference core radius $r_3$ is set at 8.85 μm.

As can be understood from FIGS. 2A to 2D, in contrast to the wave length dispersion and bending loss, which vary monotonically with the core radius, the effective core area $A_{eff}$ and the dispersion slope show respective limiting values near the design radius at the central core. Therefore, by varying the core radius with respect to the reference core radius by ±10% in the optical fiber, the chromatic dispersion at 1550 nm wavelength may be varied in a range of +4~+10 ps/nm/km while keeping the effective core cross sectional area $A_{eff}$ and the dispersion slope substantially unchanged.

Figure 3A:
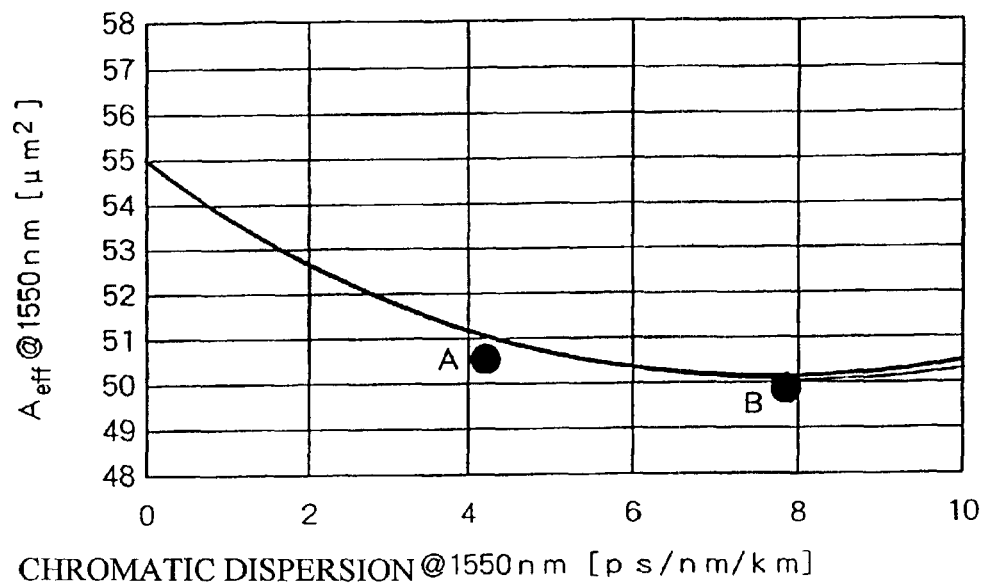
FIG. 3A is a diagram to compare measured values and calculated values of the effective core area with respect to the chromatic dispersion values in the first embodiment of the single-mode optical fiber according to the present invention.
Figure 3B:
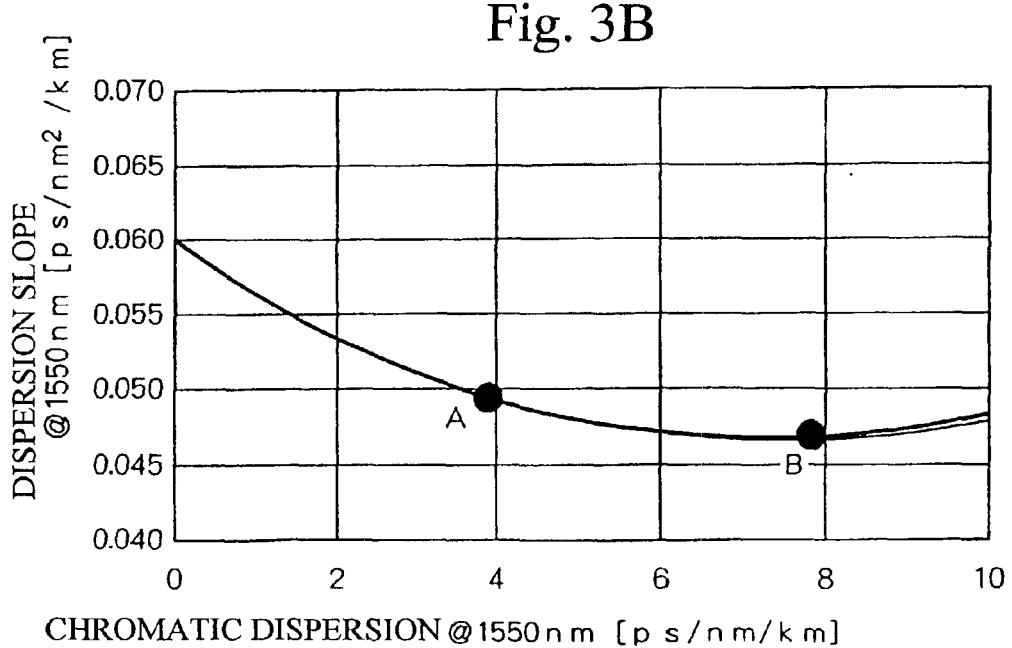
FIG. 3B is a diagram to compare measured values and calculated values of the dispersion slope with respect to the chromatic dispersion values in the first embodiment of the single-mode fiber according to the present invention.

The core material manufactured according to the design parameters, shown in FIG. 1 and Table 1, was used in making optical fiber test samples, whose core radii were varied about ±10% of the reference core radius to evaluate their optical properties. FIG. 3A shows the variation in the effective core area $A_{eff}$ and FIG. 3B shows the variation in the dispersion slope. In both cases, the horizontal axes represent chromatic dispersion at 1550 nm. In FIGS. 3A, 3B, solid points A, B refer to measured values of the optical fibers produced, and the solid lines refer to computed values. FIGS. 3A, 3B show that the effective core area $A_{eff}$ and the dispersion slope are dependent on the chromatic dispersion and exhibit respective limiting values. FIGS. 3A, 3B show that the computed values agree substantially with the measured values, and demonstrate that it is possible to manufacture optical fibers having individual chromatic dispersion while keeping the effective core area $A_{eff}$ and the dispersion slope substantially constant.

FIG. 4 shows chromatic dispersion characteristics of the optical fibers A, B shown in FIGS. 3A, 3B. Optical fiber A exhibits chromatic dispersion greater than 2 ps/nm/km in the C-band and L-band, and optical fiber B exhibits such values in the S-band, C-band and L-band, indicating that the properties are suitable for use in WDM.

Accordingly, the single-mode optical fiber in this example, comprised by a core and a cladding, whose core is comprised by not less than two layers of individual refractive indexes, can be derived by fabricating an optical fiber so that, when the core radius is changed, the fiber exhibits limiting values in more than one optical property (for example, the effective core area $A_{eff}$ and the dispersion slope) within a specific range of a reference radius, thereby enabling to realize a single-mode optical fiber, using an optical fiber having a single refractive index profile, having desired chromatic dispersion characteristics and enables to vary the chromatic dispersion within a desired range, while maintaining substantially the same optical properties in the two fiber segments.

Also, by fabricating the optical fibers in such a way that the above optical properties exhibit respective limiting values within a range of ±10% of the reference core radius, the dispersion slope can be held to less than 0.05 ps/nm²/km to enable to provide a single-mode optical fiber suitable for high speed transmission system.

Furthermore, because the effective core area $A_{eff}$ does not vary greatly when the core radius is changed, the method enables to provide a single-mode optical fiber having reduced non-linear effects.

A second example of the single-mode optical fiber will be explained with reference to FIGS. 5A to 7.

FIG. 1 shows the refractive index profile in the single-mode optical fiber used in this example.

The core radii and differences in the specific refractive indexes as shown in Table 3 were used in designing the single-mode optical fiber, and the computed values of the optical properties of the single-mode optical fiber were shown in Table 4.

TABLE 3

| $r_2/r_1$ | $r_3/r_1$ | $\Delta_1$ | $\Delta_2$ | $\Delta_3$ |
|---|---|---|---|---|
| 2.0 | 3.0 | 0.50 | −0.20 | 0.20 |

TABLE 4

| Cut-off wavelength [nm] | $A_{eff}$ [μm²] | MFD [μm] | Chromatic dispersion [ps/nm/km] | Dispersion slope [ps/nm²/km] | Bending loss [dB/m] |
|---|---|---|---|---|---|
| 1420 | 49.33 | 7.93 | +6.8 | +0.029 | 3.2 |

Notes:
values are estimated at 1550 nm wavelength; bending loss at 20 φ

FIGS. 5A to 5D show the variations in the optical properties upon changes in a core radius in an optical fiber having the refractive index profile shown in FIG. 1 and Table 3, and FIG. 5A shows the variation in the chromatic dispersion at 1550 nm wavelength; FIG. 5B shows the variation in the dispersion slope at 1550 nm wavelength; FIG. 5C shows the variation in the effective core area $A_{eff}$ at 1550 nm; and FIG. 5D shows the variation in the bending loss at a bending diameter of 20 φ. Here, the core radius shown in the x-axis is a relative value reference to design center of radius, and in this example, the reference core radius $r_3$ is set at 10.25 μm.

As can be understood from FIGS. 5A to 5D, in contrast to the wave length dispersion and bending loss, which vary monotonically with the core radius, the effective core area $A_{eff}$ and the dispersion slope exhibit respective limiting values within ±5% of the reference core radius.

In the first example, the $A_{eff}$ and the chromatic dispersion slope exhibit limiting values at about the same core radius, but to obtain the effects of the present invention, the core radii at the limiting values need not necessarily coincide, so that, as in this example, it is sufficient for the limiting values to be within ±5% of the reference core radius, and, in this example, by adjusting the core radius within ±5%, the chromatic dispersion may be varied in a range of +4~+10 ps/nm/km while maintaining the values of $A_{eff}$ and the dispersion slope substantially constant.

Figure 6A:
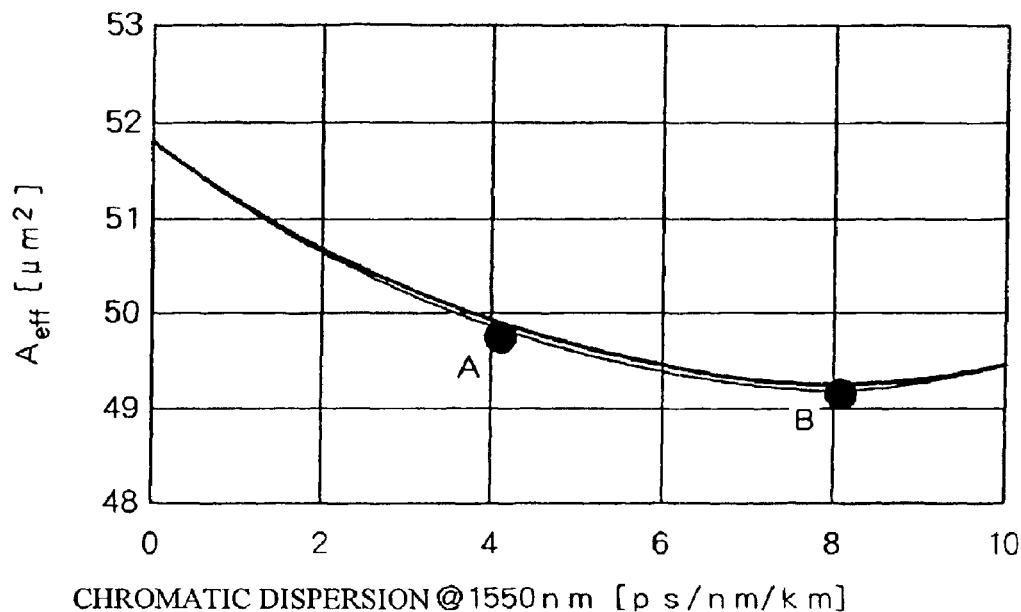
FIG. 6A is a diagram to compare measured values and calculated values of the effective core area with respect to the chromatic dispersion in the second embodiment of the single-mode optical fiber according to the present invention.
Figure 6B:
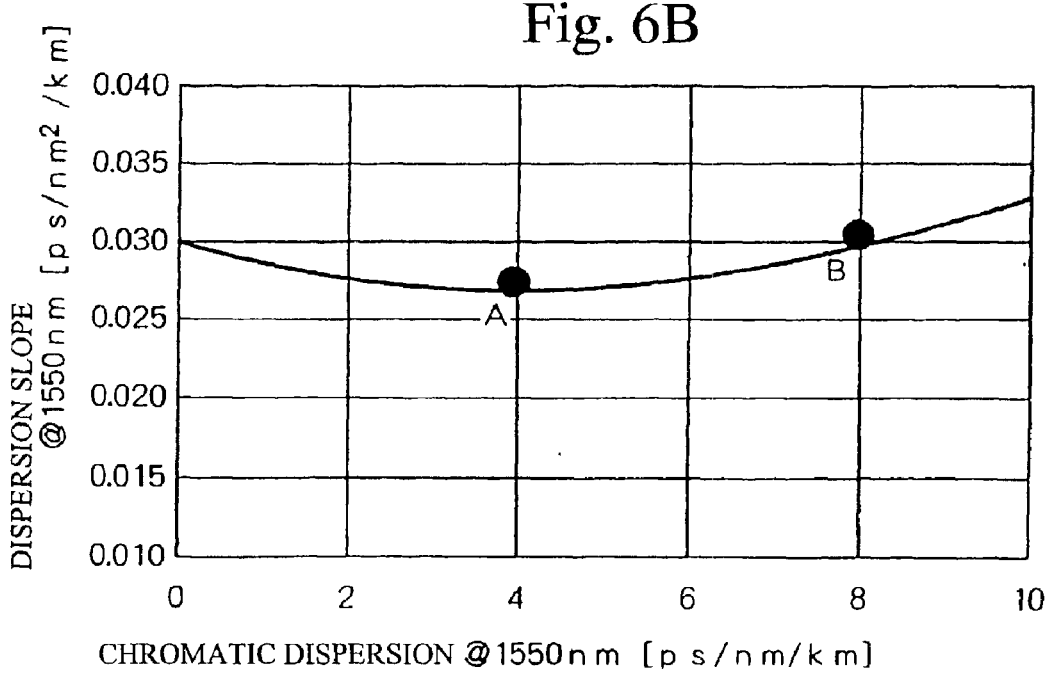
FIG. 6B is a diagram to compare measured values and calculated values of the dispersion slope with respect to the chromatic dispersion in the second embodiment of the single-mode fiber according to the present invention.

The core material manufactured according to the design parameters, shown in FIG. 1 and Table 3, was used in making optical fiber test samples, whose core radii were varied about ±5% of the reference core radius to evaluate their optical properties. FIG. 6A shows the variation in the effective core area $A_{eff}$ and FIG. 6B shows the variation in the dispersion slope. In both cases, the horizontal axes represent chromatic dispersion at 1550 nm. In FIGS. 6A, 6B, solid points A, B refer to measured values of the optical fibers produced, and the solid lines refer to computed values. FIGS. 6A, 6B show that the respective limiting values of the effective core area $A_{eff}$ and the dispersion slope are dependent on the chromatic dispersion. FIGS. 6A, 6B show that the computed values agree substantially with the measured values, and demonstrate that it is possible to manufacture optical fibers having individual chromatic dispersion while keeping the effective core area $A_{eff}$ and the dispersion slope substantially constant in the two fiber segments.

FIG. 7 shows chromatic dispersion characteristics of the optical fibers A, B shown in FIGS. 6A, 6B. Both optical fibers A and B exhibit values of chromatic dispersion greater than 2 ps/nm/km in the S-band, C-band and L-band, indicating that the properties are suitable for use in WDM.

When these results are compared with those in the first example of the optical fiber B shown in FIG. 4 exhibiting similar properties in the S-, C- and L-band, optical fiber B shown in FIG. 4 exhibits chromatic dispersion in excess of 10 ps/nm/km at 1625 nm, while it can be kept at less than 7 ps/nm/km in the optical fiber as shown in FIG. 7 so that this optical fiber is advantageous from the viewpoint of cumulative dispersion.

Also, although the chromatic dispersion of optical fiber B at 1625 nm shown in FIG. 7 is about the same as that of optical fiber A shown in FIG. 4, it enables to obtain a value of chromatic dispersion at 1460 nm greater than that of A shown in FIG. 4, so that it is effective in reducing the effects of four-wave mixing in the S-band.

Accordingly, the single-mode optical fiber in this example, comprised by a core and a cladding, and whose core is comprised by not less than two layers having individual refractive indexes, can be derived by fabricating an optical fiber so that, when the core radius is changed, the fiber exhibits limiting values in more than one optical property (for example, the effective core area $A_{eff}$ and the dispersion slope exhibit limiting values) within a specific range of a reference radius, thereby enabling to realize a single-mode optical fiber, using an optical fiber having a single refractive index profile, that enables to vary the chromatic dispersion within a desired range and having desired chromatic dispersion characteristics, while maintaining substantially the same optical properties in the two fiber segments.

Also, by fabricating the optical fibers in such a way that the above optical properties exhibit respective limiting values within a range of ±5% of the reference core radius, the dispersion slope can be held to less than 0.03 ps/nm²/km to enable to provide a single-mode optical fiber suitable for high speed transmission systems.

Furthermore, because the effective core area $A_{eff}$ does not vary greatly when the core radius is changed, the method enables to provide a single-mode optical fiber having reduced non-linear effects.

A third example of the single-mode optical fiber will be explained with reference to FIGS. 8A to 10.

The single-mode optical fiber in this example is fabricated so that more than one optical properties exhibit a limiting value of chromatic dispersion in a positive region and in a negative region.

FIG. 1 shows the refractive index profile in the single-mode optical fiber used in this example.

The core radii and differences in the specific refractive indexes as shown in Table 5 were used in designing the single-mode optical fiber, and the computed values of the optical properties of the single-mode optical fiber were shown in Table 6.

TABLE 5

| $r_2/r_1$ | $r_3/r_1$ | $\Delta_1$ | $\Delta_2$ | $\Delta_3$ |
|---|---|---|---|---|
| 2.0 | 3.0 | 0.65 | −0.25 | 0.25 |

TABLE 6

| Cut-off wavelength [nm] | $A_{eff}$ [$\mu m^2$] | MFD [$\mu m$] | Chromatic dispersion [ps/nm/km] | Dispersion slope [ps/nm²/km] | Bending loss [dB/m] |
|---|---|---|---|---|---|
| 1450 | 37.96 | 6.97 | +1.68 | +0.019 | 0.1 |

Notes:
values are estimated at 1550 nm wavelength; bending loss at 20 φ

FIGS. 8A to 8D show the variations in the optical properties upon changes in a core radius in an optical fiber having the refractive index profile shown in FIG. 1 and Table 5, and FIG. 8A shows the variation in the chromatic dispersion at 1550 nm wavelength; FIG. 8B shows the variation in the dispersion slope at 1550 nm wavelength; FIG. 8C shows the variation in the effective core area $A_{eff}$ at 1550 nm; and FIG. 8D shows the variation in the bending loss at a bending diameter of 20 φ. Here, the core radius shown in the x-axis is a relative value reference to design center of radius, and in this example, the reference core radius $r_3$ is set at 8.85 μm.

In the wavelength region shown in FIGS. 8A to 8D, it is possible to vary the chromatic dispersion over a range of ±10 ps/nm/km by providing ±5% change in the core radius with respect to the reference core that produces essentially zero chromatic dispersion. On the other hand, $A_{eff}$ and the dispersion slope exhibit limiting values in this region and become substantially constant.

Figure 9A:
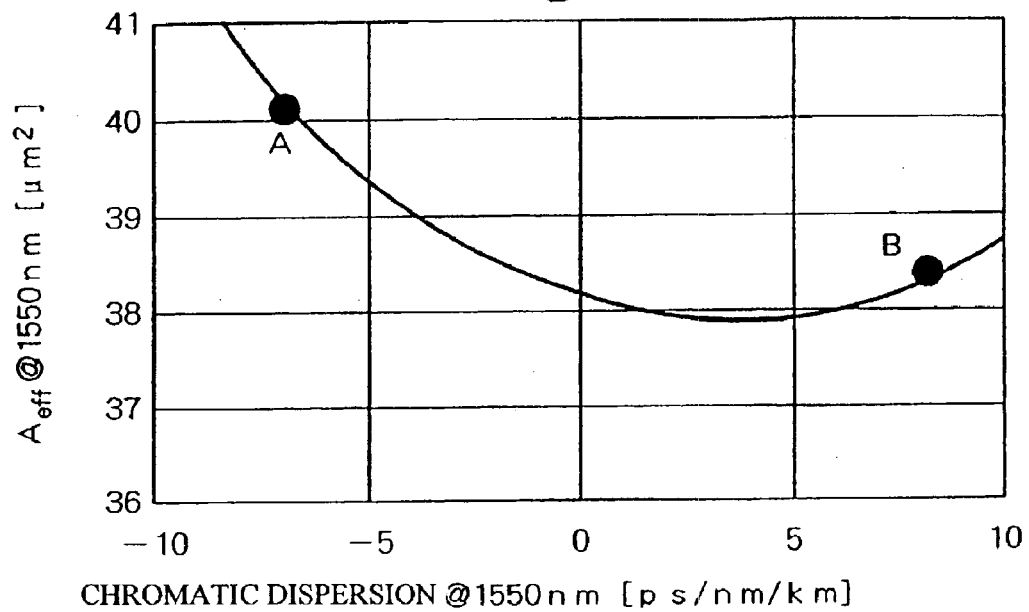
FIG. 9A is a diagram to compare measured values and calculated values of the effective core area with respect to the chromatic dispersion in the third embodiment of the single-mode optical fiber according to the present invention.
Figure 9B:
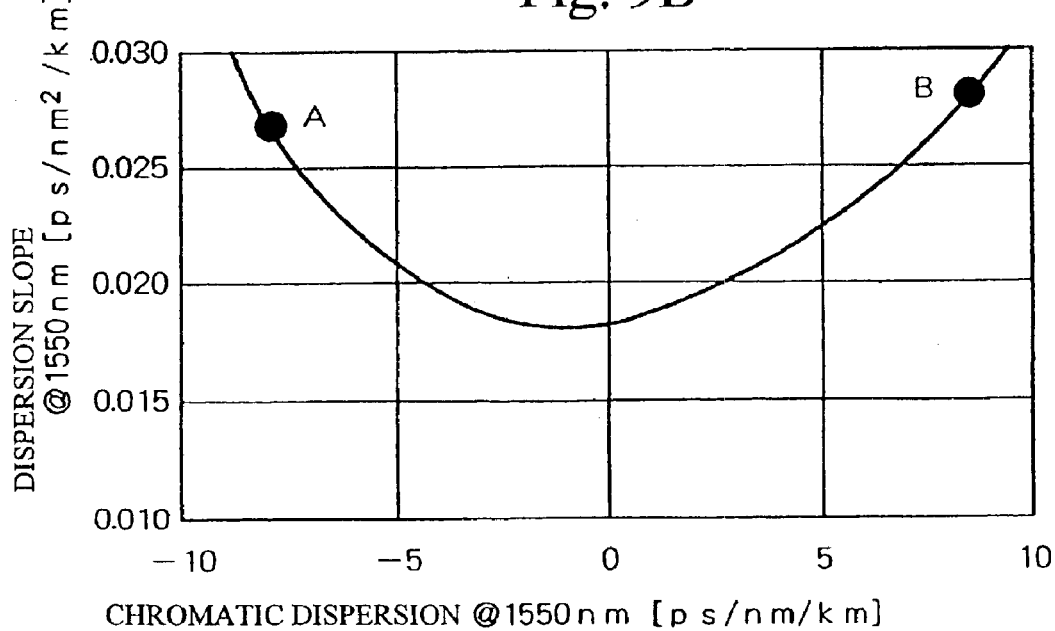
FIG. 9B is a diagram to compare measured values and calculated values of the dispersion slope with respect to the chromatic dispersion in the third embodiment of the single-mode fiber according to the present invention.

The core material manufactured according to the design parameters, shown in FIG. 1 and Table 5, was used in making optical fiber test samples, whose core radii were changed about ±5% of the reference core radius to evaluate their optical properties. FIG. 9A shows the variation in the effective core area $A_{eff}$ and FIG. 9B shows the variation in the dispersion slope. In both cases, the horizontal axes represent chromatic dispersion at 1550 nm. In FIGS. 9A, 9B, solid points A, B refer to measured values of the optical fibers produced, and the solid lines refer to computed values. FIGS. 9A, 9B show that the computed values agree substantially with the measured values.

It has thus been confirmed that, at 1550 nm wavelength, although optical fiber A has a chromatic dispersion of −8 ps/nm/km, which is quite different from a chromatic dispersion of +8 ps/nm/km for optical fiber B, it is possible to manufacture optical fibers having substantially the same $A_{eff}$ and the dispersion slope.

Accordingly, the single-mode optical fiber in this example can be derived by fabricating an optical fiber so that, when the core radius is changed in the region in which the chromatic dispersion varies from a positive to a negative value, the fiber exhibits limiting values in more than one optical property (for example, the effective core area $A_{eff}$ and the dispersion slope), thereby enabling to realize a single-mode optical fiber, using an optical fiber having a single distribution of refractive indexes, that exhibits positive and negative chromatic dispersion while maintaining the optical properties substantially constant in the two fiber segments.

Also, by fabricating the optical fibers in such a way that the above optical properties exhibit respective limiting values within a range of ±5% of the reference core radius, the dispersion slope can be held to less than 0.03 ps/nm²/km to enable to provide a single-mode optical fiber suitable for high speed transmission system.

A fourth example of the single-mode optical fiber will be explained with reference to FIGS. 11A to 14.

The single-mode optical fiber in this example is based on an improvement in the dispersion characteristics described in the third example. The single-mode optical fiber in the third example produced an inversion in the sign of the chromatic dispersion while maintaining the $A_{eff}$ and the dispersion slope substantially constant, but in this example, the optical fiber produces an inversion in both dispersion values and the dispersion slope while maintaining the $A_{eff}$ unchanged.

FIG. 1 shows the refractive index profile in the single-mode optical fiber used in this example.

The core radii and differences in the specific refractive indexes as shown in Table 7 were used in designing the single-mode optical fiber, and the computed values of the optical properties of the single-mode optical fiber were shown in Table 8.

TABLE 7

| $r_2/r_1$ | $r_3/r_1$ | $\Delta_1$ | $\Delta_2$ | $\Delta_3$ |
|---|---|---|---|---|
| 2.5 | 3.0 | 0.70 | −0.30 | 0.60 |

TABLE 8

| Cut-off wavelength [nm] | $A_{eff}$ [$\mu m^2$] | MFD [$\mu m$] | Chromatic dispersion [ps/nm/km] | Dispersion slope [ps/nm²/km] | Bending loss [dB/m] |
|---|---|---|---|---|---|
| 1440 | 32.23 | 6.41 | +1.54 | +0.001 | 0.17 |

Notes:
values are estimated at 1550 nm wavelength; bending loss at 20 φ

Figure 11A:
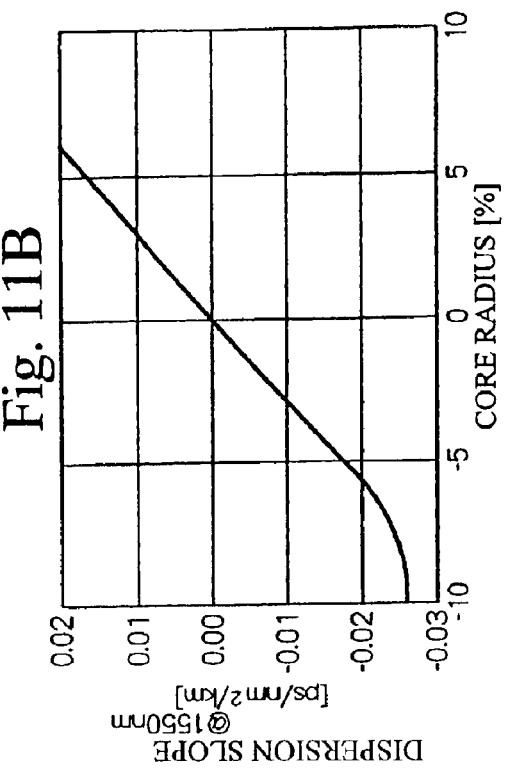
FIG. 11A is a diagram showing calculated values of variation in the chromatic dispersion with respect to changes in the core radius in a fourth embodiment of the single-mode optical fiber according to the present invention.
Figure 11B:
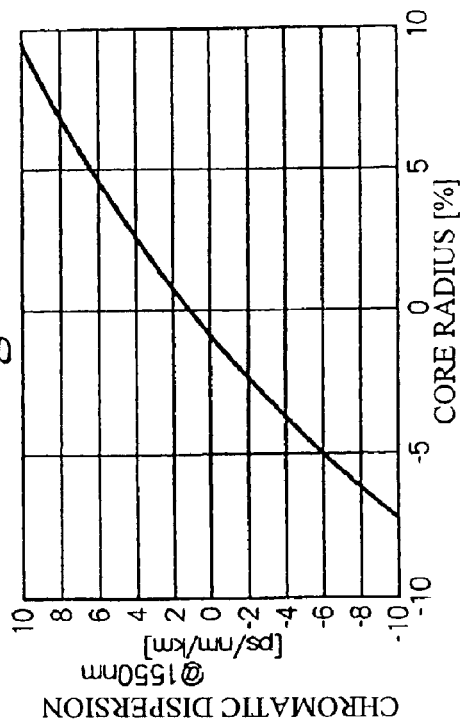
FIG. 11B is a diagram showing calculated values of variation in the dispersion slope with respect to changes in the core radius in the fourth embodiment of the single-mode optical fiber according to the present invention.
Figure 11C:
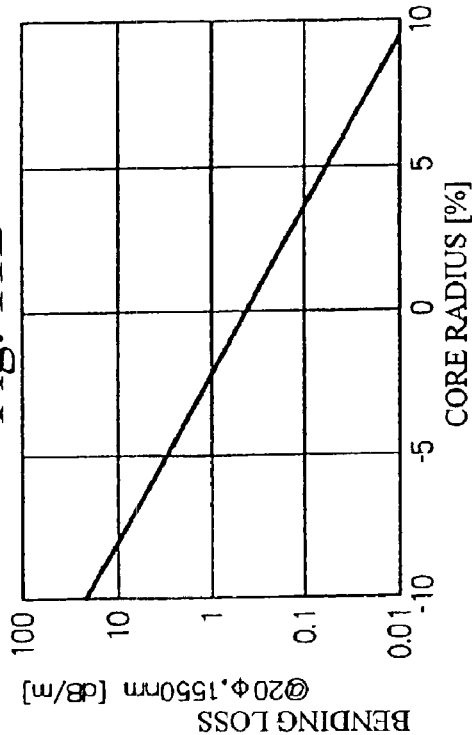
FIG. 11C is a diagram showing calculated values of variation in the effective core area with respect to changes in the core radius in the fourth embodiment of the single-mode optical fiber according to the present invention.
Figure 11D:
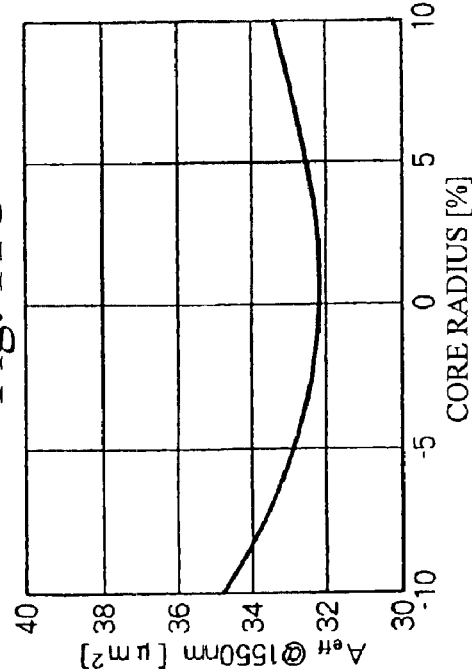
FIG. 11D is a diagram showing calculated values of variation in the bending loss with respect to changes in the core radius in the fourth embodiment of the single-mode optical fiber according to the present invention.

FIGS. 11A to 11D show the variations in the optical properties upon changes in a core radius in an optical fiber having the refractive index profile shown in FIG. 1 and Table 7, and FIG. 11A shows the variation in the chromatic dispersion at 1550 nm wavelength; FIG. 11B shows the variation in the dispersion slope at 1550 nm wavelength; FIG. 11C shows the variation in the effective core area $A_{eff}$ at 1550 nm; and FIG. 11D shows the variation in the bending loss at a bending diameter of 20 φ. Here, the core radius shown in the x-axis is a relative value reference to design center of radius, and in this example, the reference core radius $r_3$ is set at 8.3 μm.

In this example also, the $A_{eff}$ exhibits limiting values when the core radius is changed, but the feature characteristic is the variation in the dispersion slope that is in contrast to the variation in the optical fiber in the first to third examples, in which the dispersion slope exhibited limiting values but the change itself occurred over a small region. In contrast, this example differs from the foregoing examples in that the change in the dispersion slope occurs over a very large region, as shown in FIG. 11B, such that the values are inverted from a negative sign to a positive sign.

Figure 12A:
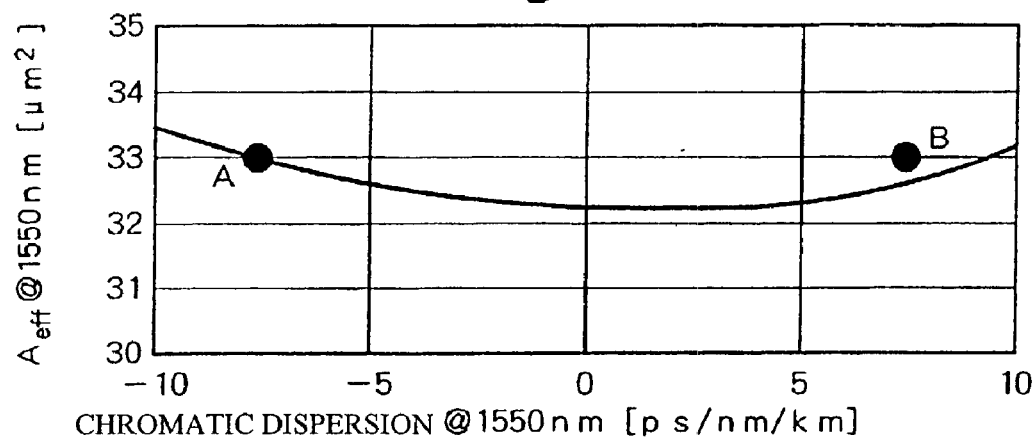
FIG. 12A is a diagram to compare measured values and calculated values of the effective core area with respect to the chromatic dispersion in the fourth embodiment of the single-mode optical fiber according to the present invention.
Figure 12B:
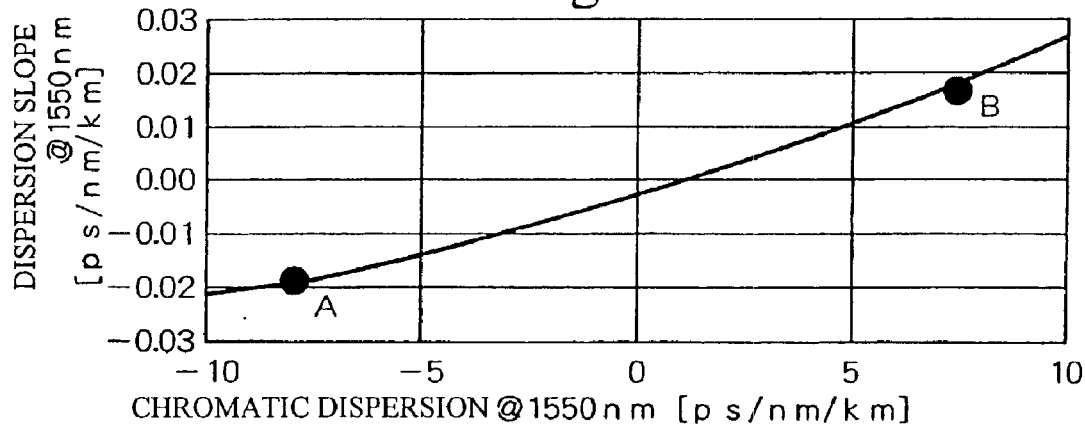
FIG. 12B is a diagram to compare measured values and calculated values of the dispersion slope with respect to the chromatic dispersion in the fourth embodiment of the single-mode fiber according to the present invention.

The core material manufactured according to the design parameters, shown in FIG. 1 and Table 7, was used in making optical fiber test samples, whose core radii were changed about ±10% of the reference core radius to evaluate their optical properties. FIG. 12A shows the variation in the effective core area $A_{eff}$ and FIG. 12B shows the variation in the dispersion slope. In both cases, the horizontal axes represent chromatic dispersion at 1550 nm. In FIGS. 12A and 12B, solid points A, B refer to measured values of the optical fibers produced, and the solid lines refer to computed values. FIGS. 12A and 12B show that the computed values agree substantially with the measured values.

Figure 12C:
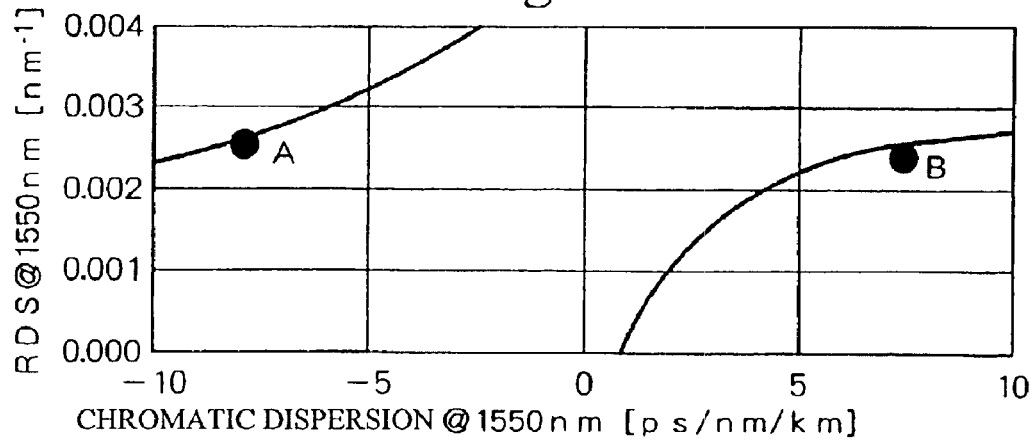
FIG. 12C is a diagram to compare measured values and calculated values of the RDS with respect to chromatic dispersion in the fourth embodiment of the single-mode optical fiber according to the present invention.

Also, FIG. 12C shows RDS (relative dispersion slope) values with respect to the chromatic dispersion, where RDS refers to a parameter defined by the following expression:

RDS=dispersion slope/chromatic dispersion in units of $nm^{-1}$.

This example demonstrated that it is possible to manufacture an optical fiber having substantially constant levels of $A_{eff}$ and RDS and whose chromatic dispersion are opposite in polarity but the absolute values are equal in magnitude.

Optical fiber A and optical fiber B shown in FIG. 12C have essentially the same RDS values but the signs of the chromatic dispersion are opposite and their absolute values are equal in magnitude. It follows that the dispersion slope can be compensated by using a combination of such optical fibers.

Figure 13:
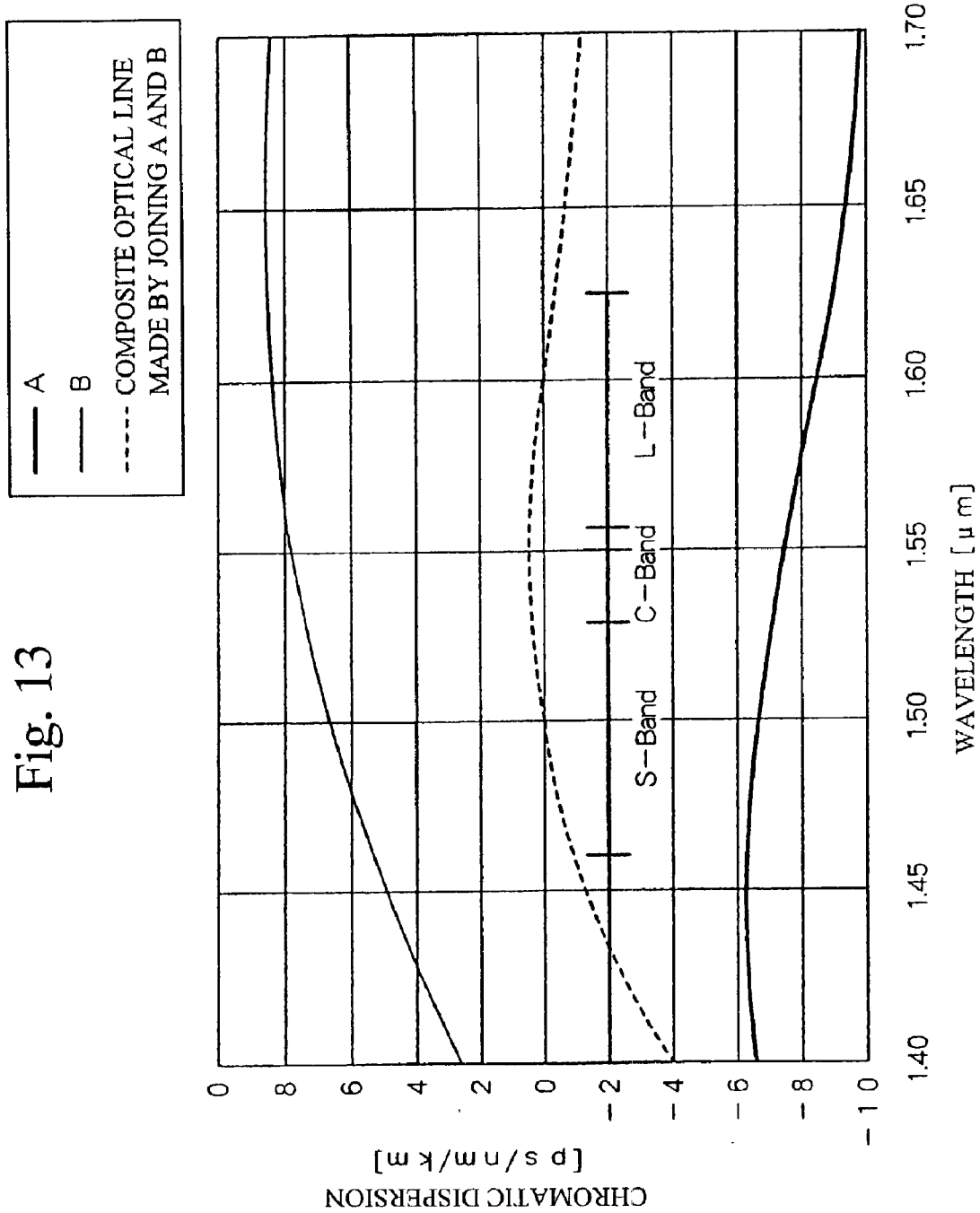
FIG. 13 is a diagram showing the chromatic dispersion in the operative wavelength bandwidth in the fourth embodiment of the single-mode optical fiber according to the present invention.
Figure 14:
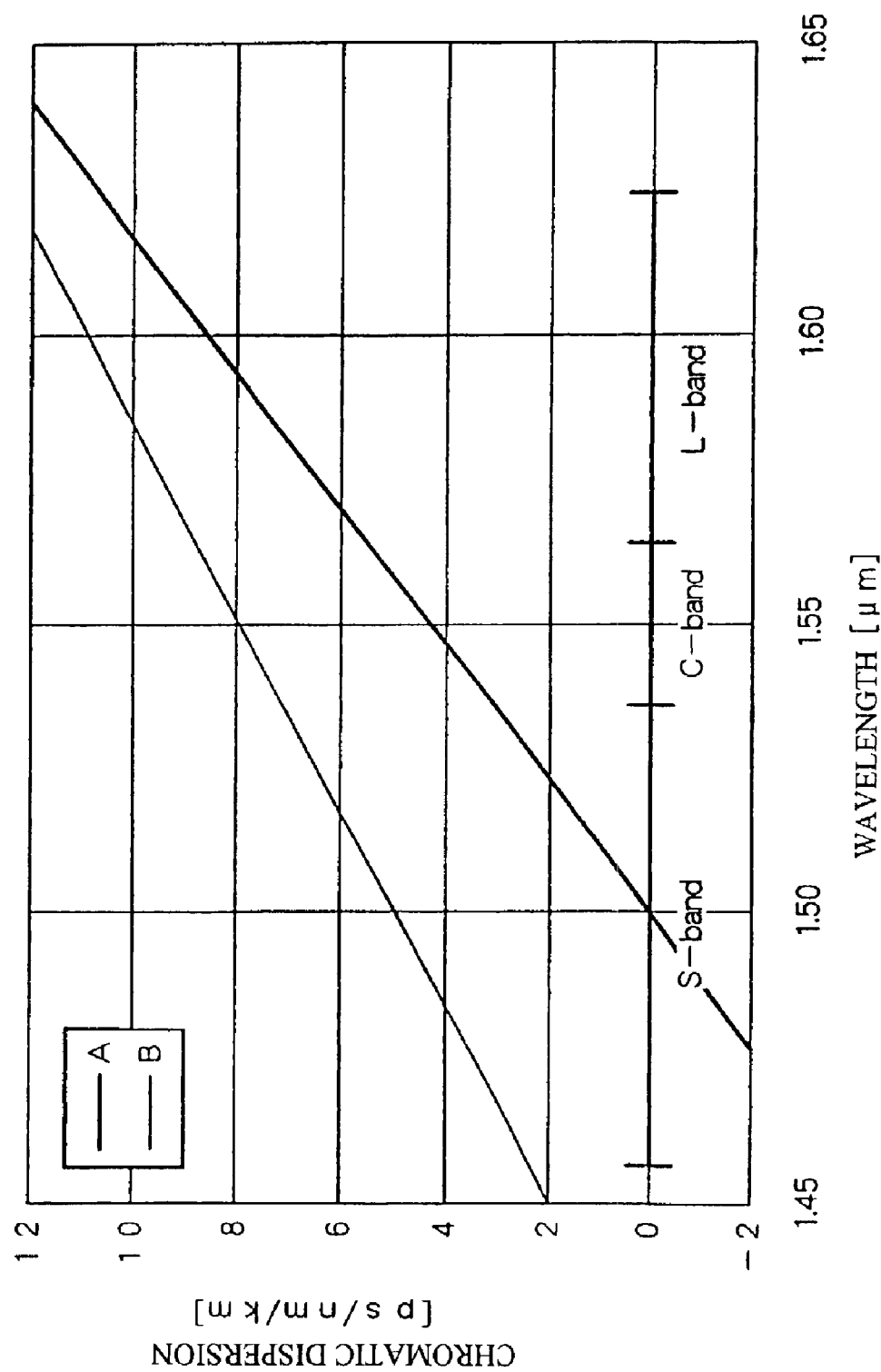
FIG. 14 is a diagram showing the chromatic dispersion in a conventional WDM optical fiber.

FIG. 13 shows the chromatic dispersion of optical fibers A, B shown in FIGS. 12A to 12C, and the chromatic dispersion of a composite optical line produced by joining optical fiber A to optical fiber B. This composite optical line has a segment length ratio of 1:1 for the two types of optical fibers.

As can be understood from FIG. 13, the composite optical line enables to control the absolute values of the chromatic dispersion to less than 2 ps/nm/km in all regions of the S-, C- and L-bands. In other words, the use of an optical fiber having the refractive index profile illustrated in this example enables to manufacture a self-compensating optical fiber that can correct its own dispersion characteristics by simply changing the core radius.

Accordingly, the single-mode optical fiber of this example can be derived by fabricating an optical fiber so that, when the core radius is changed in a region where the dispersion slope varies from a positive value to a negative value, the fiber exhibits limiting values in more than one optical property (for example, the effective core area $A_{eff}$ and the dispersion slope) within a specific range of a reference radius in a region where the dispersion slope varies from a positive value to a negative value, so that the chromatic dispersion and the dispersion slope will exhibit opposite signs while maintaining the optical properties substantially constant in the two fiber segments.

Also, a self-compensating optical line that corrects the dispersion slope is enabled by combining such single-mode fibers to produce a composite optical line.

Here, it should be noted that, although the effective core area $A_{eff}$ was chosen as a parameter to exhibit limiting values in this example, the same effects can be obtained by choosing the mode field diameter to exhibit limiting values.

What is claimed is:

1. A single-mode optical fiber comprising a core and a cladding, wherein the core comprises two or more core layers having individual refractive indexes and at least one optical property out of the four listed below having an extreme value within a range of ±10% change of a core radius of the single-made optical fiber with respect to a predetermined reference core radius; the optical property wherein the at least one optical property is selected from the group comprising a chromatic dispersion, a dispersion slope, an effective core area, and a bending loss.

2. A single-mode optical fiber according to claim 1, wherein the optical property exhibits the extreme value within a range of ±5% of the radius of the core.

3. A single-mode optical fiber according to claim 1, wherein the optical property exhibits the extreme value in a region extending from a positive chromatic dispersion to a negative chromatic dispersion.

4. A single-mode optical fiber according to claim 3, wherein the optical property exhibits the extreme value in a region extending from a positive dispersion slope to a negative dispersion slope.

5. A single-mode optical fiber according to claim 1, wherein the dispersion slope is 0.05 ps/nm²/km or less in an operating wavelength bandwidth.

6. A single-mode optical fiber according to claim 1, wherein the dispersion slope is 0.03 ps/nm²/km or less in an operating wavelength bandwidth.

7. A single-mode optical fiber according to claim 1, wherein at least one layer of the layers composing the core having individual refractive indexes has a refractive index which is less than a refractive index of a cladding.

8. A composite optical line compensating the dispersion slope by combining the single-mode optical fiber according to claim 4.

* * * * *